(12) United States Patent
Xiang

(10) Patent No.: US 6,478,420 B2
(45) Date of Patent: Nov. 12, 2002

(54) MAGNETIC SPECTACLES

(75) Inventor: Qiyun Xiang, Wenzhou (CN)

(73) Assignee: YCC Optical Manufacturer, Pullman, WA (US)

( * ) Notice: Subject to any disclaimer, the term of this patent is extended or adjusted under 35 U.S.C. 154(b) by 0 days.

(21) Appl. No.: 09/683,969

(22) Filed: Mar. 7, 2002

(65) Prior Publication Data

US 2002/0080325 A1 Jun. 27, 2002

(51) Int. Cl.⁷ .................................................. G02C 9/00
(52) U.S. Cl. ........................ 351/47; 351/57; 351/110; 351/124
(58) Field of Search .................... 351/47, 48, 57, 351/58, 41, 44, 158, 124, 110

(56) References Cited

U.S. PATENT DOCUMENTS

| | | |
|---|---|---|
| 3,838,914 A | 10/1974 | Fernandez |
| 4,070,103 A | 1/1978 | Meeker |
| 4,798,455 A | 1/1989 | Yoe et al. |
| 4,988,181 A | 1/1991 | Riach, Jr. |
| 5,181,051 A | 1/1993 | Townsend et al. |
| 5,389,981 A | 2/1995 | Riach, Jr. |
| 5,416,537 A | 5/1995 | Sadler |
| 5,568,207 A | 10/1996 | Chao |
| 5,737,054 A | 4/1998 | Chao |
| 6,139,141 A | 10/2000 | Zider |
| 6,164,774 A | 12/2000 | Cate |
| 6,231,179 B1 | 5/2001 | Lee |
| 6,293,671 B1 * | 9/2001 | Masunaga ............... 351/47 |
| 2001/0021001 A1 | 9/2001 | Lee |

FOREIGN PATENT DOCUMENTS

| | | |
|---|---|---|
| EP | 1152280 | 7/2001 |
| WO | WO 96/37800 | 11/1996 |
| WO | WO 97/16761 | 5/1997 |
| WO | WO 01/13163 | 2/2001 |
| WO | WO 01/51982 | 7/2001 |

* cited by examiner

*Primary Examiner*—Hung Xuan Dang
(74) *Attorney, Agent, or Firm*—Buckingham, Doolittle & Burroughs, LLP

(57) ABSTRACT

The invention relates to a rimless spectacles for use with auxiliary lenses by which magnets are used to attract and hold the auxiliary lenses in place.

38 Claims, 2 Drawing Sheets

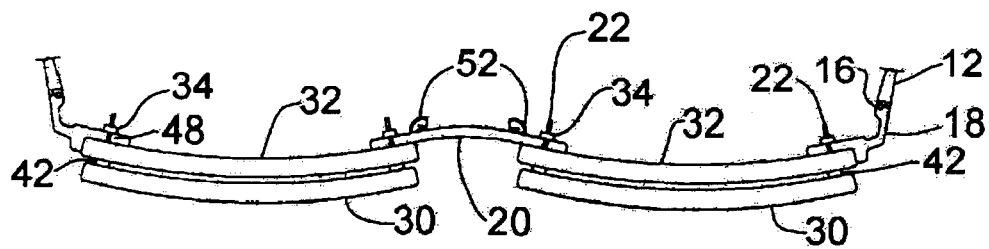
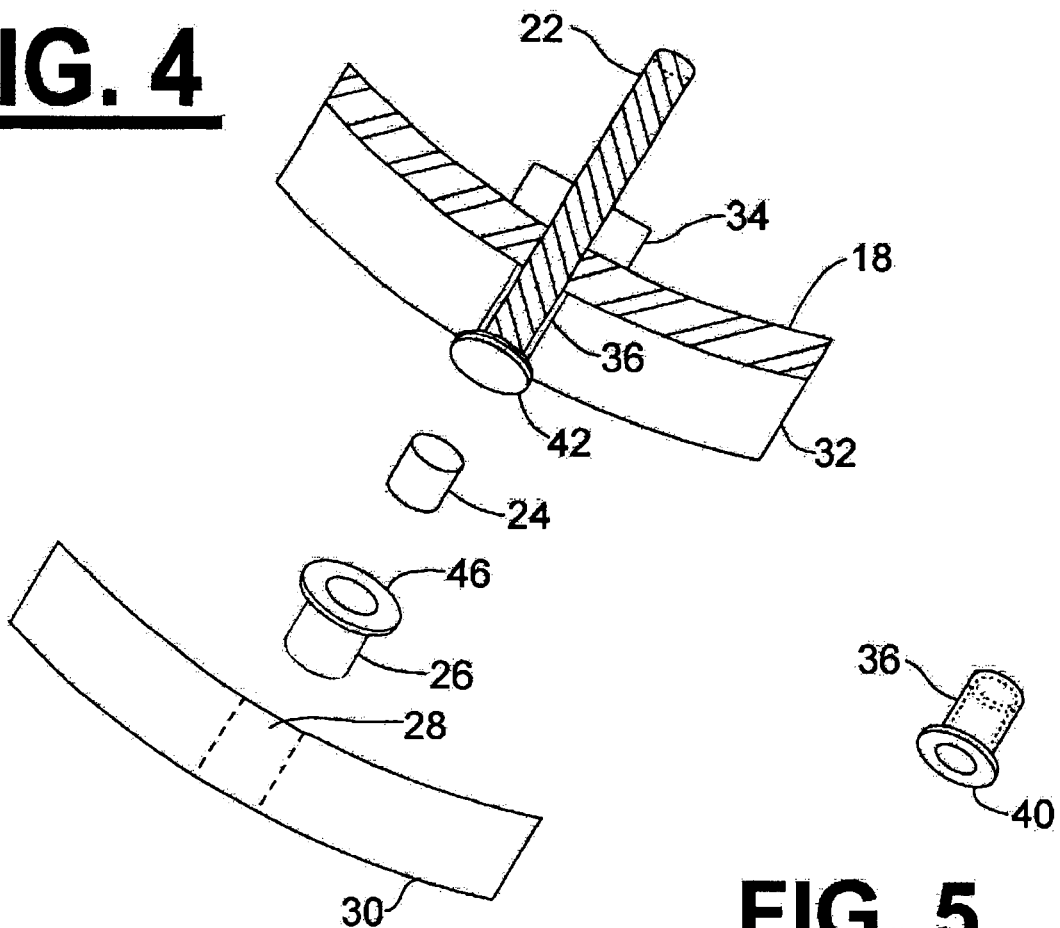

MAGNETIC SPECTACLES

BACKGROUND OF INVENTION

The invention relates generally to magnetic rimless spectacles wherein auxiliary lenses are fixedly held in place by magnetic attraction between an embedded magnet in an auxiliary lens and a juxtaposed magnetic head of a screw in the primary frame.

There are many situations where it would be advantageous to be able to quickly change from one type of eyeglass lens to another, among which may be mentioned would be a change from clear lenses to colored, or a change from lenses for correcting for myopia to lenses for reading. Typically, this has necessitated two or more pairs of eyeglasses or spectacles to be carried, resulting in a bulky and unsightly appearance because of the fact that each pair of eyeglasses not only has a lens and frame parts, but also the folding temples.

One improvement over the early Prior Art solution of separate pairs of glasses was the incorporation of first and second magnetic members which are attached to both the primary and auxiliary frames. This resulted in the user only being required to carry an auxiliary frame. However, the presence of magnets on the front surface of the primary frame were also undesirable, particularly when not being used in conjunction with an auxiliary frame.

This led to still further improvements in the Prior Art which positioned the magnets behind the primary frame as well as on the inside of the legs, as well as leading to magnet orientations which were both vertical and horizontal. However, what has been missing from the Prior Art is the ability to use magnetic attachment on rimless frames.

SUMMARY OF INVENTION

The invention is directed to the use of magnetic attachments of auxiliary lenses to primary lenses in a rimless spectacle frame.

In one principal aspect of the present invention, the attachment will utilize magnets which are embedded in the auxiliary lenses to separately attach to magnetic or magnetizable screw heads which are used to connect both the nose bridge and legs of the spectacle to the primary lenses.

In another principal aspect of the present invention, the invention enables a user to attach auxiliary lenses which are connected by a bridge piece to a rimless frame by magnetic attachment.

Accordingly, it is an object of the present invention to provide a wearer of rimless spectacles with magnetically attached auxiliary lenses, each lens being separately attached.

It is another object of the present invention to provide a wearer of rimless spectacles with magnetically attached auxiliary lenses, the auxiliary lenses being connected by a bridge piece.

These and other objects of the present invention will become more readily apparent from a reading of the following detailed description taken in conjunction with the accompanying drawings wherein like reference numerals indicate the parts and appended claims.

BRIEF DESCRIPTION OF DRAWINGS

The invention may take physical form in certain parts and arrangements of parts, a preferred embodiment of which will be described in detail in the specification and illustrated in the accompanying drawings which form a part hereof, and wherein:

FIG. 3 is top elevational view of FIG. 1 when the auxiliary lenses are attached to the primary frame;

FIG. 4 is an enlarged assembly view showing one side screw attachment, the screw shaft and front extension shown in cross-section; and FIG. 5 is an enlarged view of a cylindrical sleeve or bushing for use in the primary lens.

DETAILED DESCRIPTION

Figure 1:
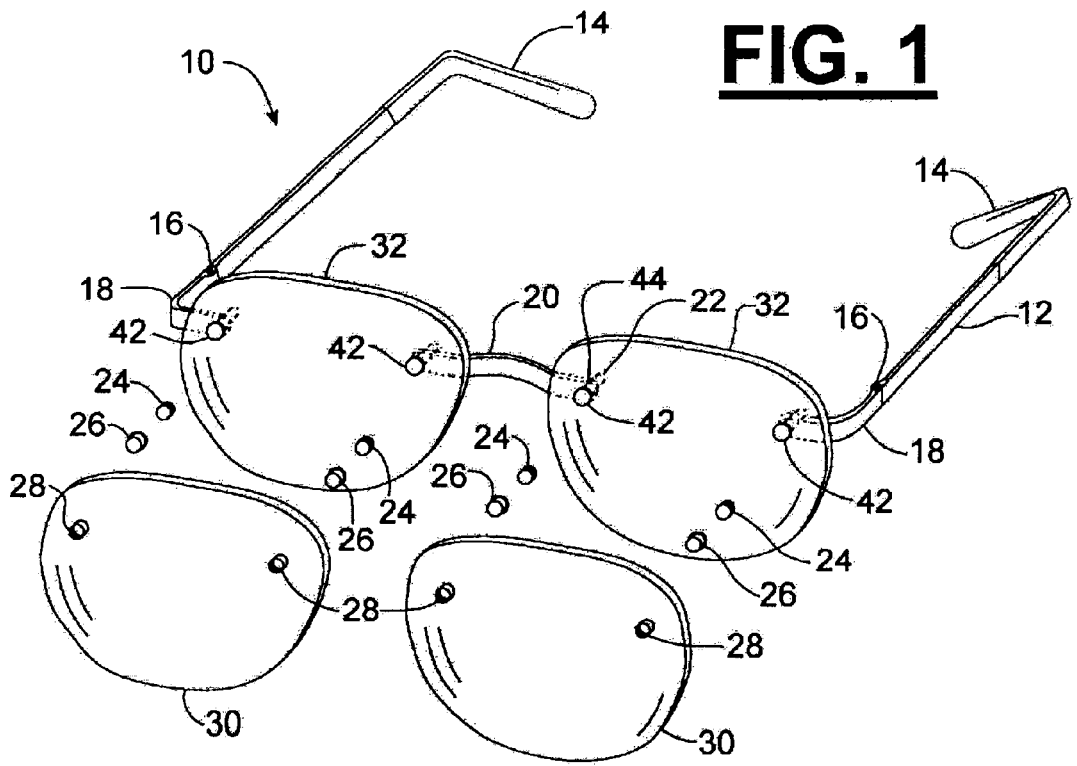
FIG. 1 is a perspective view of a primary frame and detached auxiliary lenses, the auxiliary lenses shown with insertable magnets and magnet holders.

Referring now to the drawings wherein the showings are for purposes of illustrating the preferred embodiment of the invention only and not for purposes of limiting the same, the Figures show a magnetic attachment means for a rimless spectacle frame.

As illustrated in FIG. 1, the rimless primary frame has a pair of primary lenses 32 connected by a bridge 20 and adapted for wearing through engagement of a pair of bendable rearwardly extending legs 12. The legs may be pivotally inwardly collapsable for easy storage by axial rotation about pivot hinge 16 which is fixedly connected to leg extension piece 18 for fastening engagement with one of the primary lenses 32. For the comfort of the user, a pair of pliable plastic inserts 14 are often optionally inserted over legs 12. Each leg extension piece 18 is typically fastened to one primary lens 32 by insertion of a screw through aperture 44 in the primary lens as well as aperture 48 in leg extension piece 18. Screw shaft 22 has a head 42 which is greater in diameter than a diameter of aperture 44 to enable secure fastening engagement of primary lens 32 with leg extension piece 18 by rotational longitudinal axial movement of nut 34 on the threaded end of screw 22. While a screw is envisioned to embody the preferred embodiment of the invention, it is also envisioned that the fastening means could also be a non-threaded shaft with a head onto which a frictional gripper could be inserted by longitudinal axial movement thereby frictionally securing primary lens 32 and extension piece 18 together. Optionally, cylindrical sleeve or bushing 36, with laterally and peripherally extending ledge 40, better illustrated in FIG. 5, is positioned within apertured opening 44 of primary lens 32 prior to fastening.

Primary lenses 32 are held in a spaced apart relationship by bridge piece 20 which is secured to the lenses in a manner similar to that described for leg extension pieces 18, i.e., preferably by threaded engagement of nuts 34 with threaded screw shafts 22, optionally within cylindrical sleeves 36 within apertured openings 44 of the two primary lenses 32. Bridge piece 20 will typically additionally have nose pads 52 fixedly attached for resting on a user's nose.

At least head 42 of the fastening screw will be magnetic or magnetizable or must be capable of having a sufficient amount of iron such that magnetic interaction with a magnet will result in an attractive force. In one preferred embodiment, the screw is an iron-chromium carbon metal composite. In a preferred embodiment, the composition of this screw will be approximately 60% chromium, 1% carbon, 2.5% silver, 0.06% phosphorus, 0.05% sulfur with a balance of iron. The key is that at least the head of the screw must be capable of interacting with a magnet and contain a sufficient amount of magnetic material so that an auxiliary lens 30 may be held in close proximity to the primary lens 32 by essentially magnetic attractive forces alone, even when subjected to forces normal to the axis of magnetic attraction, such as gravity or other downward forces having a vector normal to that of the axis of magnetic attraction as created by walking, jogging or running. The composition of the screw or other fastening device is predicated by the magnetic requirements, but also by aesthetic concerns, such as the ability to be color plated to match the frame colors. It is within the skill of those in the art to modify the composition of the fastening attachment to achieve these goals, as well as hardness considerations inherent in normal fabrication of fastening devices which often have slots in the head of the screw to facilitate rotational movement of the screw fastening shaft. It should be noted that physical contact between magnet 24 and screw head 42 is not essential, although preferred, if the strength of the magnet is sufficiently strong.

Auxiliary lenses 30 are attached to primary lenses 32 by magnetic attraction of a pair of magnets 24 which are embedded into each auxiliary frame 30 in apertures 28. Optionally, magnets 24 are positioned within magnet holders or sleeves 26, optionally having laterally and peripherally extending ledges 46, prior to insertion into apertures 28. It is evident that apertures 28 in the auxiliary lenses must be in fairly close mating alignment with juxtaposed apertures 44 in the frames in order to maximize the magnetic attractive forces which retain the auxiliary lenses in physical proximity with the primary lenses. While a total of four mating attractive magnet and screw head locations are shown in FIGS. 1 and 3, there is no need to limit the invention to this number and higher numbers of magnetic pairs are envisioned. For example, for users where aggressive downward normal forces to the axis of magnetic attraction are expected to be incurred, i.e., running or jogging, additional mating magnetic attractive combinations are within the scope of the invention. In this alternative embodiment, it is envisioned that additional apertures would be positioned in both the auxiliary and primary lenses, but in these instances, additional magnets 24 with optional magnet holders or sleeve 26 would be positioned in both the primary and auxiliary lenses.

Figure 2:
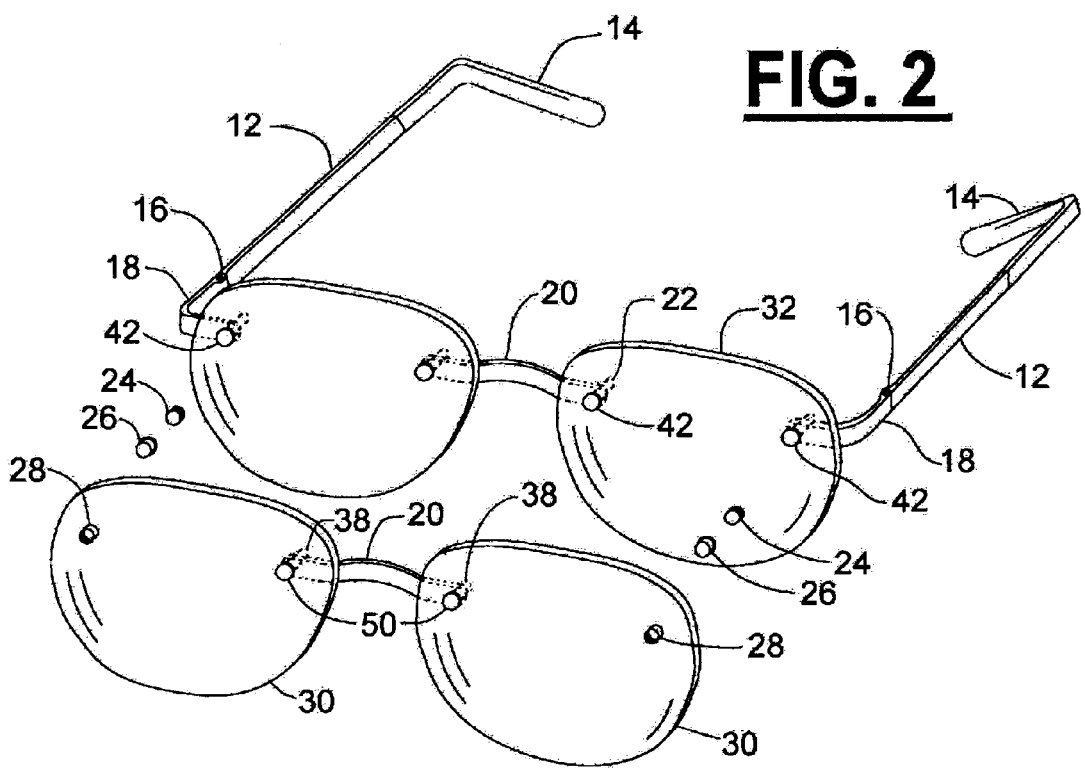
FIG. 2 is a perspective view similar to FIG. 1 with a bridge between the two auxiliary lenses.

The invention additionally is not limited to magnetic attraction of separate auxiliary lenses to primary lenses. It is within the scope of the invention to have a bridge piece positioned between the two separate auxiliary lenses shown in FIG. 2. In this alternative embodiment, it is believed that only one magnetic pair combination is required on each lens and that attraction would be supplemented by a magnetic attraction between the two bridges between the primary lenses and auxiliary lenses respectively, although FIG. 2 illustrates a more preferred embodiment, wherein four pairs of magnetic attractions are utilized. In this embodiment, it should be understood that bridge 20 between auxiliary lenses 30, may be of a geometry which is essentially identical as shown for that between the primary lenses, or it may be different. The bridge may be attached to the back of the auxiliary lenses or may be attached to the front. It should be recognized that when a bridge is positioned between the auxiliary lenses as illustrated in FIG. 2, the clip or nut 38 which secures the head of the auxiliary screw 50 to the auxiliary lens must be relatively flat, and the shaft associated with the auxiliary screw head is typically shorter than that typically used to fasten the primary lens to either the nose bridge 20 or leg extension piece 18 so as to be able to engage with the screw head 42 securing the primary frame bridge to the primary lenses.

In one specific embodiment, the magnet used in the invention is a unipolar magnet with a gauss rating of 10,000. The magnetic property has a Hc rating equal to or greater than 4.93. It is recognized that these values are presented for illustration of the best mode only, and the invention is not limited to the same, and both higher and lower magnetic values are capable of being used in the instant invention. It is recognized by those of ordinary skill in the art that as the surface area increases between the attractive regions, it may be possible to use magnets which are less strong, while if magnet size minimization is the goal, then more powerful magnets are required. It is also understood that unipolar magnets are not absolutely essential for this invention, Particularly when more than four attachment pairs are envisioned, when polar magnets are believed to be useful in the additional locations.

While it is envisioned that metallic rimless frames are the best mode of practicing the invention as this time, it is envisioned that legs 12 and bridge piece 20 could be made of plastic. In this particular specialized embodiment, it is anticipated that optional magnets may be positioned within bridge piece 20 as well as optionally into a bridge piece which connects auxiliary lenses 30 in this specialized embodiment.

This invention has been described in detail with reference to specific embodiments thereof, including the respective best modes for carrying out each embodiment. It shall be understood that these illustrations are by way of example and not by way of limitation.

What is claimed is:

1. A spectacle comprising:
   (a) a pair of primary lenses, each of said lenses having a pair of apertures at a peripheral edge of opposed inner and outer sides of said primary lenses;
   (b) a pair of legs having two ends, one end of each leg having an aperture disposed therethrough;
   (c) a first pair of securing means insertable through said outer apertures in said primary lenses and said aperture in said leg, said securing means having at least a magnetic head portion;
   (d) a bridge between said pair of primary lenses, said bridge having an aperture at each opposed end;
   (e) a second pair of securing means insertable through said inner apertures in said primary lenses and said apertures in said bridge, said securing means having at least a magnetic head portion; and
   (f) a pair of auxiliary lenses, each of said lenses having at least a pair of partial holes in said auxiliary lenses, said holes juxtaposed with said apertures in said primary lenses;
   (g) each of said holes in said auxiliary lenses having a magnet disposed therein for magnetic engagement with at least a head of said first and second securing means.

2. The spectacle of claim 1 which further comprises:
   (a) a plastic sleeve between said magnet and said auxiliary lens.

3. The spectacle of claim 2 wherein
   (a) said sleeve further comprises a laterally and peripherally extending shelf.

4. The spectacle of claim 3 which further comprises:
   (a) a hollow plastic sleeve between said first or second securing means and said primary lens.

5. The spectacle of claim 4 wherein
(a) said hollow sleeve further comprises a laterally and peripherally extending shelf.
6. The spectacle of claim 5 wherein
(a) said first and second securing means are a screw having a shaft, said shaft at least partially threaded and a nut having mating threads with said at least partially threaded shaft.
7. The spectacle of claim 6 wherein said screw further comprises:
(a) a flat head, said head composition comprising at least a portion of iron.
8. The spectacle of claim 7 wherein said head further comprises
(a) at least one slot.
9. The spectacle of claim 8 wherein said pair of auxiliary lenses further comprises
(a) a bridge connecting said auxiliary lenses.
10. The spectacle of claim 9 wherein
(a) said bridge is magnetic or magnetizable.
11. A spectacle comprising:
(a) a pair of primary lenses, each of said lenses having a pair of apertures at a peripheral edge of opposed inner and outer sides of said primary lenses;
(b) a pair of legs having two ends, one end of each leg having an aperture disposed therethrough;
(c) a first pair of securing means insertable through said outer apertures in said primary lenses and said aperture in said leg, said securing means having at least a magnetic head portion;
(d) a bridge between said pair of primary lenses, said bridge having an aperture at each opposed end;
(e) a second pair of securing means insertable through said inner apertures in said primary lenses and said apertures in said bridge, said securing means having at least a magnetic head portion; and
(f) a pair of auxiliary lenses, each of said lenses having at least a pair of partial holes in said auxiliary lenses, said holes juxtaposed with said apertures in said primary lenses, and wherein
  (i) said auxiliary lenses further comprise an auxiliary bridge therebetween, said auxiliary bridge having an aperture at each opposed end,
  (ii) a third pair of securing means insertable through said inner apertures in said auxiliary lenses and said apertures in said auxiliary bridge,
  (iii) said third pair of securing means being magnetizable or magnetic on an inner side for magnetic engagement with at least a head of said second securing means;
(g) each of said outer holes in said auxiliary lenses having a magnet disposed therein for magnetic engagement with at least a head of said first securing means.
12. The spectacle of claim 11 which further comprises:
(a) a plastic sleeve between said magnet and said auxiliary lens.
13. The spectacle of claim 12 wherein
(a) said sleeve further comprises a laterally and peripherally extending shelf.
14. The spectacle of claim 13 which further comprises:
(a) a hollow plastic sleeve between said first or second securing means and said primary lens.
15. The spectacle of claim 14 wherein
(a) said hollow sleeve further comprises a laterally and peripherally extending shelf.

16. The spectacle of claim 15 wherein
(a) said first and second securing means are a screw having a shaft, said shaft at least partially threaded and a nut having mating threads with said at least partially threaded shaft.
17. The spectacle of claim 16 wherein said screw further comprises:
(a) a flat head, said head composition comprising at least a portion of iron.
18. The spectacle of claim 17 wherein said head further comprises
(a) at least one slot.
19. A spectacle comprising:
(a) a rimless primary frame having a pair of primary lenses, each of said lenses having a pair of apertures at a peripheral edge of opposed inner and outer sides of said primary lenses;
(b) a pair of legs having two ends, one end of each leg having an aperture disposed therethrough;
(c) a first pair of securing means insertable through said outer apertures in said primary lenses and said aperture in said leg, said securing means having at least a magnetic portion;
(d) a bridge between said pair of primary lenses, said bridge having an aperture at each opposed end;
(e) a second pair of securing means insertable through said inner apertures in said primary lenses and said apertures in said bridge, said securing means having at least a magnetic portion; and
(f) a pair of auxiliary lenses, each of said lenses having at least a pair of holes in said auxiliary lenses, said holes juxtaposed with said apertures in said primary lenses;
(g) each of said holes in said auxiliary lenses having a magnet disposed therein for magnetic engagement with said first and second securing means.
20. The spectacle of claim 19 which further comprises:
(a) a plastic sleeve between said magnet and said auxiliary lens.
21. The spectacle of claim 20 wherein
(a) said sleeve further comprises a laterally and peripherally extending shelf.
22. The spectacle of claim 21 which further comprises:
(a) a hollow plastic sleeve between said first or second securing means and said primary lens.
23. The spectacle of claim 22 wherein
(a) said hollow sleeve further comprises a laterally and peripherally extending shelf.
24. The spectacle of claim 23 wherein
(a) said first and second securing means are a screw having a shaft, said shaft at least partially threaded and a nut having mating threads with said at least partially threaded shaft.
25. The spectacle of claim 24 wherein said screw further comprises:
(a) a flat head, said head composition comprising at least a portion of iron.
26. The spectacle of claim 25 wherein said head further comprises
(a) at least one slot.
27. The spectacle of claim 26 wherein said pair of auxiliary lenses further comprises
(a) a bridge connecting said auxiliary lenses.
28. The spectacle of claim 27 wherein
(a) said bridge is magnetic or magnetizable.

29. A spectacle comprising:
(a) a rimless primary frame having a pair of primary lenses, each of said lenses having a pair of apertures at a peripheral edge of opposed inner and outer sides of said primary lenses;
(b) a pair of legs having two ends, one end of each leg having an aperture disposed therethrough;
(c) a first pair of securing means insertable through said outer apertures in said primary lenses and said aperture in said leg, said securing means having at least a magnetic portion;
(d) a bridge between said pair of primary lenses, said bridge having an aperture at each opposed end;
(e) a second pair of securing means insertable through said inner apertures in said primary lenses and said apertures in said bridge, said securing means having at least a magnetic portion; and
(f) a pair of auxiliary lenses, each of said lenses having at least a pair of holes in said auxiliary lenses, said holes juxtaposed with said apertures in said primary lenses, and wherein
  (i) said auxiliary lenses further comprise an auxiliary bridge therebetween, said auxiliary bridge having an aperture at each opposed end,
  (ii) a third pair of securing means insertable through said inner apertures in said auxiliary lenses and said apertures in said auxiliary bridge,
  (iii) said third pair of securing means having at least a magnetic portion on an inner side for magnetic engagement with said magnetic second securing means;
(g) each of said outer holes in said auxiliary lenses having a magnet disposed therein for magnetic engagement with said first magnetic securing means.

30. The spectacle of claim 29 which further comprises:
(a) a plastic sleeve between said magnet and said auxiliary lens.

31. The spectacle of claim 30 wherein
(a) said sleeve further comprises a laterally and peripherally extending shelf.

32. The spectacle of claim 31 which further comprises:
(a) a hollow plastic sleeve between said first or second securing means and said primary lens.

33. The spectacle of claim 32 wherein
(a) said hollow sleeve further comprises a laterally and peripherally extending shelf.

34. The spectacle of claim 33 wherein
(a) said first and second securing means are a screw having a shaft, said shaft at least partially threaded and a nut having mating threads with said at least partially threaded shaft.

35. The spectacle of claim 34 wherein said screw further comprises:
(a) a flat head, said head composition comprising at least a portion of iron.

36. The spectacle of claim 35 wherein said head further comprises
(a) at least one slot.

37. A rimless spectacle comprising:
(a) a pair of primary lenses, each of said lenses having a pair of apertures at a peripheral edge of opposed inner and outer sides of said primary lenses;
(b) a pair of legs having two ends, one end of each leg having an aperture disposed therethrough;
(c) a first pair of at least partially magnetic securing means insertable through said outer apertures in said primary lenses and said aperture in said leg;
(d) a bridge between said pair of primary lenses;
(e) a second pair of at least partially magnetic securing means insertable through said inner apertures in said primary lenses and in communication with said bridge;
(f) a pair of auxiliary lenses, each of said lenses having at least a pair of holes in said auxiliary lenses, said holes juxtaposed with said apertures in said primary lenses;
(g) each of said holes in said auxiliary lenses having a magnet disposed therein for magnetic engagement with said first and second securing means.

38. A rimless spectacle comprising:
(a) a pair of primary lenses, each of said lenses having a pair of apertures at a peripheral edge of opposed inner and outer sides of said primary lenses;
(b) a pair of legs having two ends, one end of each leg having an aperture disposed therethrough;
(c) a first pair of at least partially magnetic securing means insertable through said outer apertures in said primary lenses and said aperture in said leg;
(d) a bridge between said pair of primary lenses;
(e) a second pair of at least partially magnetic securing means insertable through said inner apertures in said primary lenses and in communication with said bridge;
(f) a pair of auxiliary lenses, each of said lenses having at least a pair of holes in said auxiliary lenses, said holes juxtaposed with said apertures in said primary lenses, and wherein
  (i) said auxiliary lenses further comprise an auxiliary bridge therebetween,
  (ii) a third pair of at least partially magnetic securing means insertable through said inner apertures in said auxiliary lenses and in communication with said auxiliary bridge;
(g) each of said outer holes in said auxiliary lenses having a magnet disposed therein for magnetic engagement with said first magnetic securing means.

* * * * *